United States Patent
Watermann et al.

(10) Patent No.: US 12,506,651 B2
(45) Date of Patent: Dec. 23, 2025

(54) METHOD AND DEVICE FOR SYNCHRONIZATION

(71) Applicant: Sennheiser electronic SE & Co. KG, Wedemark (DE)

(72) Inventors: Jan Watermann, Hannover (DE); Sebastian Georgi, Langenhagen (DE)

(73) Assignee: Sennheiser electronic SE & Co. KG, Wedemark (DE)

(*) Notice: Subject to any disclaimer, the term of this patent is extended or adjusted under 35 U.S.C. 154(b) by 91 days.

(21) Appl. No.: 18/563,073

(22) PCT Filed: May 19, 2022

(86) PCT No.: PCT/EP2022/063539
§ 371 (c)(1),
(2) Date: Nov. 21, 2023

(87) PCT Pub. No.: WO2022/248324
PCT Pub. Date: Dec. 1, 2022

(65) Prior Publication Data
US 2024/0267277 A1  Aug. 8, 2024

(30) Foreign Application Priority Data
May 26, 2021  (DE) ...................... 10 2021 113 579.6

(51) Int. Cl.
*H04L 27/26* (2006.01)
*H04J 13/00* (2011.01)
*H04L 5/00* (2006.01)

(52) U.S. Cl.
CPC ...... *H04L 27/2663* (2013.01); *H04J 13/0062* (2013.01); *H04L 5/0007* (2013.01); *H04L 27/2657* (2013.01); *H04L 27/2675* (2013.01)

(58) Field of Classification Search
CPC ............. H04L 27/2663; H04L 27/2659; H04L 27/2675; H04L 27/2613; H04L 27/2657;
(Continued)

(56) References Cited

U.S. PATENT DOCUMENTS 8,385,494 B2 *  2/2013  Fan ..................... H04L 27/2657
                                                               375/362
8,433,011 B2 *  4/2013  Otsuka ................ H04L 27/2675
                                                               375/343
(Continued)

FOREIGN PATENT DOCUMENTS

| DE | 10 2013 001 790 A1 | 3/2014 |
| DE | 11 2017 006 701 T5 | 9/2019 |
| WO | WO 2012/027880 A1  | 3/2012 |

OTHER PUBLICATIONS

PCT International Search Report dated Sep. 14, 2022 for International Appln. No. PCT/EP2022/063539.
(Continued)

*Primary Examiner* — Betsy Deppe
(74) *Attorney, Agent, or Firm* — Jon E. Gordon; Haug Partners LLP

(57) ABSTRACT

For radio transmission via OFDM (Orthogonal Frequency Division Multiplex) and TDMA (Time Division Multiple Access), it is important to have at the receiver the exact carrier frequency, and further to perform time synchronization. For time synchronization and simultaneous detection of a carrier frequency offset, a complex-valued synchronization sequence such as e.g. a Zadoff-Chu-sequence is transmitted twice: first in its original version and then, after a predefined time span, in its complex conjugate version. At the receiver, the two corresponding correlation maxima are detected by cross-correlation, and the time span between the maxima is measured. The measured time span is compared to the predefined time span and a time offset is determined. The
(Continued)

time offset can be used to improve the synchronization accuracy and to determine the carrier frequency offset.

16 Claims, 4 Drawing Sheets

(58) Field of Classification Search
CPC . H04L 27/2655; H04L 5/0007; H04J 13/0062
See application file for complete search history.

(56) References Cited

U.S. PATENT DOCUMENTS

| | | |
|---|---|---|
| 8,774,122 B2 * | 7/2014 | Chang ................ H04L 27/2613 370/324 |
| 10,886,965 B2 * | 1/2021 | Knopp .................... H04B 1/69 |
| 2021/0083915 A1 | 3/2021 | Si et al. |

OTHER PUBLICATIONS

Ericsson, "On NTN synchronization, random access, and timing advance," Nov. 2019, vol. RAN WG1, No. Reno, USA; Nov. 18-Nov. 22, 2019.

Chenchen Zhang et al., "Root Pair Selection for Two-root Random Access Preamble," 2021 IEEE 93$^{rd}$ Vehicular Technology Conference, Apr. 2021, pp. 1-6.

Gul et al., "Timing and Frequency Synchronization for OFDM Downlink Transmissions Using Zadoff-Chu Sequences," IEEE Transactions on Wireless Communications, NJ, US, vol. 14, No. 3, Mar. 2015, pp. 1716-179.

* cited by examiner

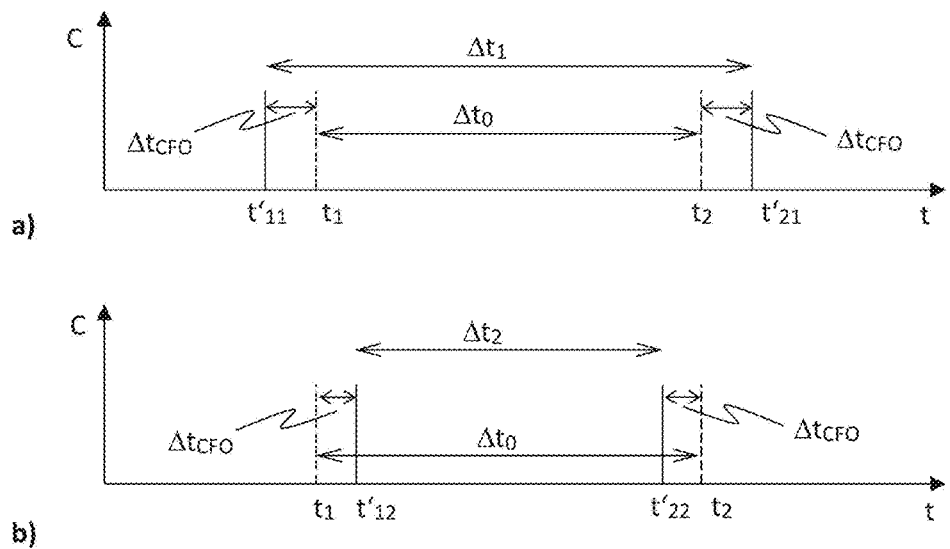
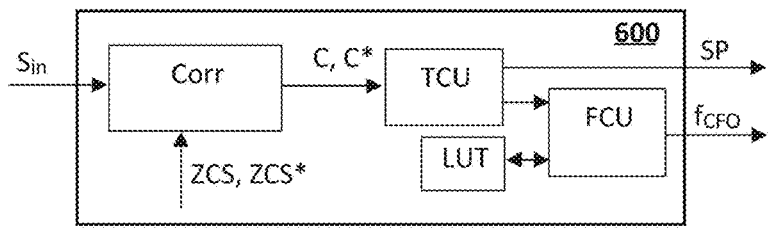
Fig. 5
Fig. 6
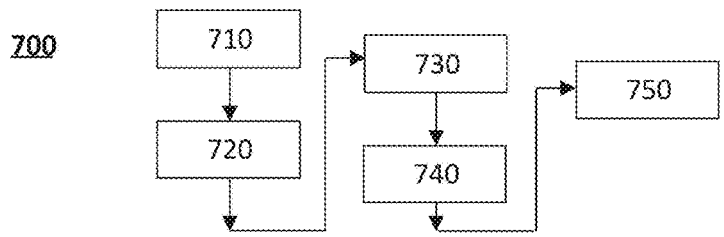
Fig. 7
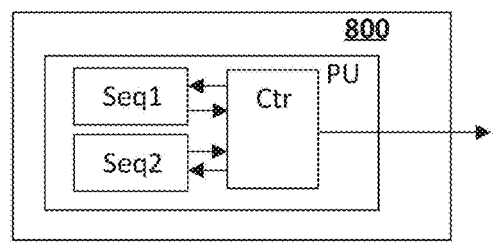
Fig. 8

METHOD AND DEVICE FOR SYNCHRONIZATION

CROSS-REFERENCE TO RELATED APPLICATIONS

This application is the National Stage entry under 35 U.S.C. § 371 of International Application No. PCT/EP2022/063539, filed on May 19, 2022, published on Dec. 1, 2022 under Publication Number WO 2022/248324 A1, which claims the benefit of priority to German Patent Application No. 10 2021 113 579.6 filed on May 26, 2021, the entireties of which are herein incorporated by reference.

FIELD OF DISCLOSURE

The invention relates to a method for synchronization, in particular for synchronization in radio transmission. The invention relates also to a corresponding device.

BACKGROUND

With radio transmission using OFDM (Orthogonal Frequency Division Multiplex), it is important to know the exact carrier frequencies at the receiver in order to enable the demodulation. For this, it is necessary to estimate as precisely as possible a deviation of the transmitter from the setpoint frequency, the so-called carrier frequency offset (CFO). This deviation can have various causes, e.g. deviations in the clock of the transmitter or frequency shifts that occur with a mobile transmitter due to the Doppler effect. In some cases, e.g. with broadband time division multiple access (TDMA) transmission using OFDM, also a time synchronization is necessary, since the involved transmitters and receivers must work according to a common time frame.

The so-called Schmidl-Cox synchronization used in some systems can be used both for time synchronization and for an initial estimate of the carrier frequency offset. Although it is robust against reflective radio channels, it turned out to be unsuitable under the influence of narrowband interferers. To be able to cope with narrowband interferers within the broadband channel, a more robust synchronization method is required. With increasing radio transmission, also mutual interference increases. Narrowband interferers are devices causing interference that only effects individual frequencies or very narrow frequency ranges (compared to broadband systems such as OFDM).

A known type of synchronization uses a sequence that is based on the so-called Zadoff-Chu-(Z-C-) sequence. This is a complex-valued sequence with constant amplitude, the cyclic auto-correlation of which results in zero. Z-C-sequences are well suited to enable the most robust synchronization possible, both with a low signal-to-noise ratio (SNR) and with reflective radio channels as well as under the influence of narrowband interferers within the broadband channel. For the synchronization, the received signal is cross-correlated with the known reference signal. During the correlation, superimpositions of the transmitted signal are converted into individual maxima of the amplitude of the correlation output due to the special properties of the Z-C-sequence. As a result, reflections of the radio channel can be clearly separated, and the time synchronization can be based on the highest of all maxima.

However, when synchronizing with Z-C-sequences, it is no longer possible to estimate the carrier frequency offset (CFO), because the CFO leads to temporal shifts in the detection when conventional Z-C-sequences are detected by means of correlation. Since this temporal shift is unknown, the CFO can no longer be determined.

For the German priority application, the German Patent and Trademark Office has cited the following documents: DE 10 2013 001 790 A1, DE 11 2017 006 701 T5, US 2021/0083915 A1 and WO 2012/027880 A1.

SUMMARY OF THE INVENTION

It is therefore an object of the present invention to enable a robust method that allows both, a time synchronization and an estimation of the carrier frequency offset, and that works even with reflective radio channels, low SNR and under the influence of narrowband interferers.

The object is achieved by a method for synchronizing a receiver according to claim 1. The claim 6 relates to a method for generating a synchronization signal. Corresponding devices are disclosed in the claims 10 and 16.

The invention is based on two essential findings. First, it was recognized that the temporal shift of the detection of the Z-C-sequence is greater the greater a carrier frequency offset is. Second, it was found that the direction of the temporal shift is reversed if the Z-C-sequence is used in its complex conjugate form instead of its original form. Therefore, according to the invention, a Z-C-sequence is transmitted twice: once in its original form and then, after a precisely defined period of time, in its complex conjugate form. During reception, two correlation maxima result, namely one for the original form and one for the complex conjugate form. The time span between the correlation maxima is measured. From this, the time offset can be determined precisely by comparing the measured time span with the known predefined time span that is on the transmission side between the first and the complex conjugate second Z-C-sequence. If the time offset is known, it can be used to determine the CFO. In addition, the phase difference of the correlation results of the two correlation maxima can be used to further increase the accuracy of the estimation.

Further advantageous embodiments are disclosed in the dependent claims and the following detailed description.

BRIEF DESCRIPTION OF THE DRAWINGS

Further details and advantageous embodiments are depicted in the drawings, showing in FIG. 1 shows a representation of a simple Zadoff-Chu-sequence in the time domain;

FIG. 5 shows a time diagram of the correlation results of the modified Zadoff-Chu-sequence;

FIG. 6 shows a block diagram of a synchronization device for receivers;

FIG. 7 shows a flow-chart of a method for synchronization, according to an embodiment; and FIG. 8 shows a block diagram of a device for generating a synchronization signal.

DETAILED DESCRIPTION

Figure 1:
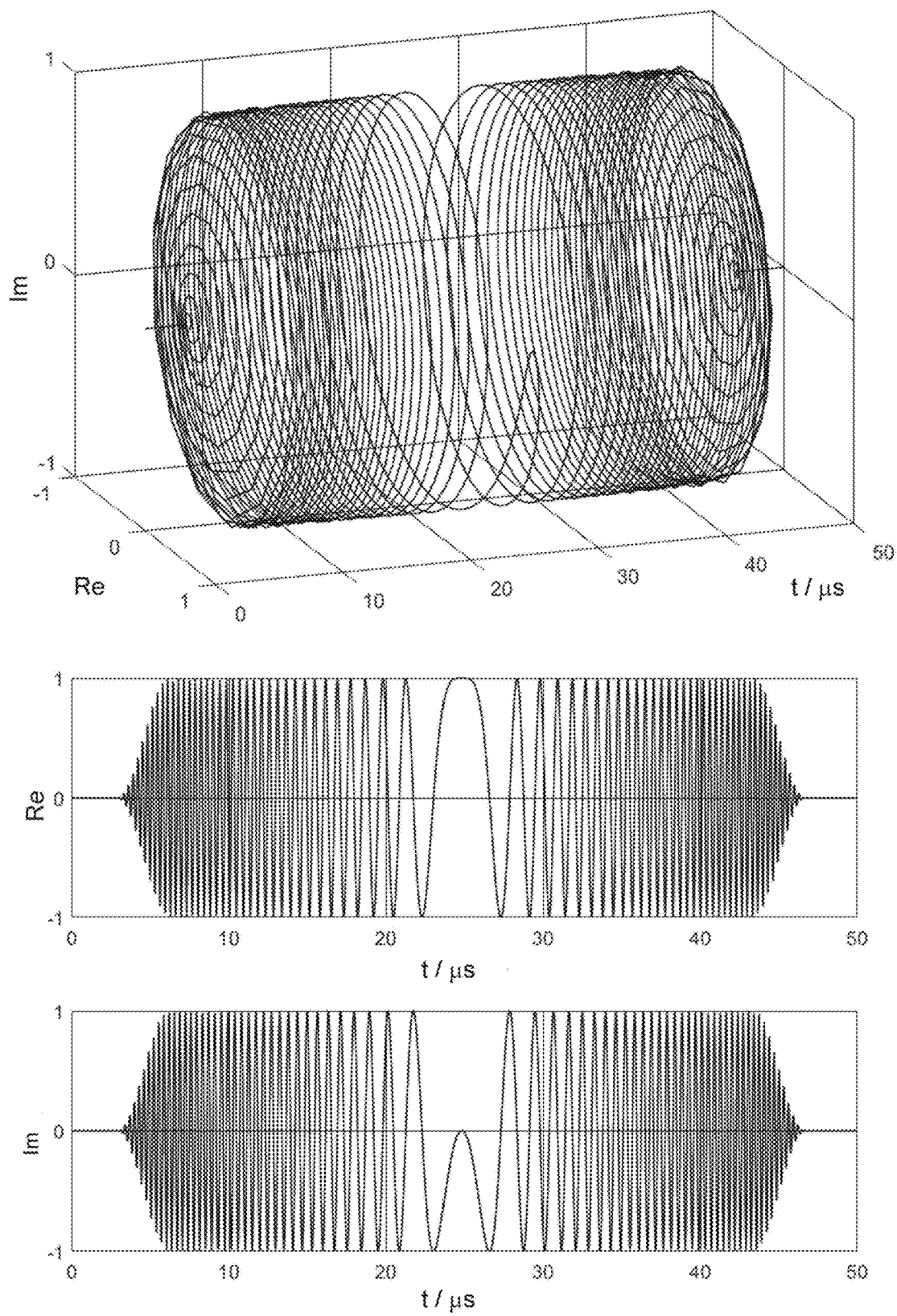

FIG. 1 shows a representation of a simple Zadoff-Chu-(Z-C-) sequence in the time domain. The time domain signal is complex-valued and therefore has a real part Re and an imaginary part Im. In the Z-C-sequence (M=1) used here, the real part and the imaginary part oscillate at an initially high, then decreasing and then again increasing frequency. The absolute value, or the amplitude respectively, which conventionally is constantly one, is reduced at the beginning and at the end, the reason of which being described further below.

The total sequence lasts approximately 45 µs, whereby after half the time, at approximately 24 µs in FIG. 1, a "tongue" in the complex-valued curve indicates that the frequency changes from a decreasing portion into an increasing portion. This also changes the direction of rotation of the complex-valued pointer, which, for example, changes from a left turn to a right turn. The phase of the imaginary part Im remains the same as that of the real part Re, as shown in FIG. 1.

Other Z-C-sequences (M>1) have a more complex structure with plural portions of increasing or decreasing frequencies, but the above-described observations apply also in that case. Therefore, these sequences can in principle also be used for the improved synchronization according to the invention. Z-C-sequences can be parameterized; each individual Z-C-sequence depends on two coprime parameters M and N according to $$x_M(k) = \exp\left(-j \pi M k^2/N\right) \quad k = 0, 1, \ldots, N-1 \; (N \text{ even}) \quad \text{or} \quad (1a)$$

$$x_M(k) = \exp\left(-j \pi M k(k+1)/N\right) \quad k = 0, 1, \ldots, N-1 \; (N \text{ odd}) \quad (1b)$$

Figure 2:
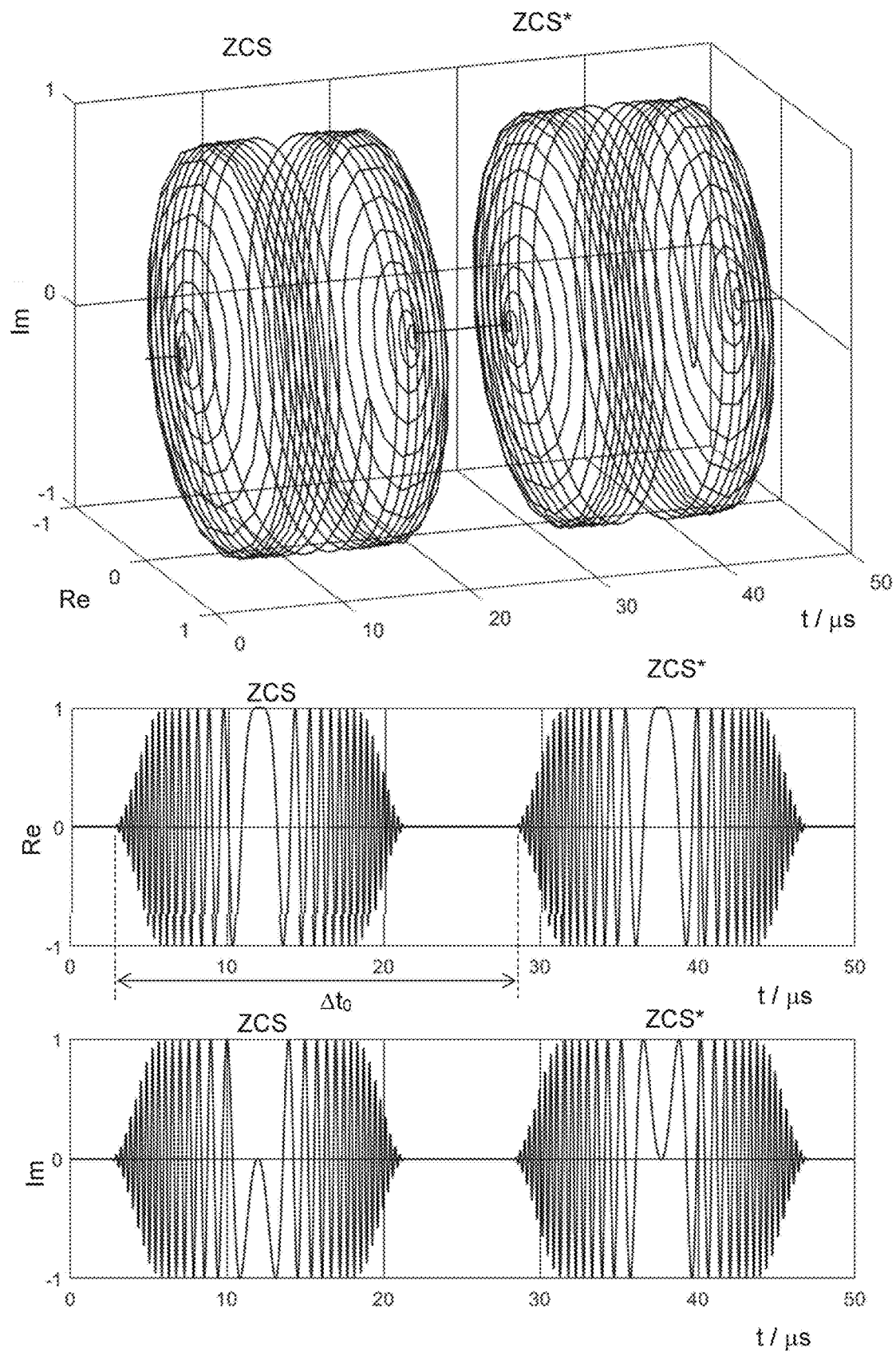
FIG. 2 shows a representation of a modified Zadoff-Chu-sequence for synchronization in the time domain.

The phase of a sequence can be modified. In the examples described here, the phase of the sequence is set such that the high-frequency components are at the beginning and at the end of the sequence. FIG. 2 shows, in the time domain, a modified Z-C-sequence that is particularly well suited for synchronization. The sequence consists of two sections: a first section, in which the original Z-C-sequence ZCS is transmitted, and a second section, in which the same Z-C-sequence in complex conjugate form ZCS* is transmitted. In this example, each of the partial sequences lasts approx. 19 µs, with no signal being sent in a period of approx. 7 µs in between. Thus, the time difference between the two partial sequences at the transmitting side is fixed and is assumed here to be, e.g., $\Delta t_0 = 26.0$ µs. Therefore, the total synchronization sequence, with the two partial sequences and the "pause" in between, fits into a time slot of a TDMA system that lasts, e.g., 19+19+7=45 µs. Each of the partial sequences begins with a high frequency that first decreases and then increases again, wherein the partial sequences are faded-in at the beginning and faded-out at the end (i.e., at the highest frequencies). Each of the partial sequences is therefore similar to the above-described simple Z-C-sequence. But since the second partial sequence is the complex conjugate version of the first partial sequence, its phase "rotates" the other way round. Therefore, its "tongue" (at approx. 37 µs) points in the opposite direction as the "tongue" of the first partial sequence (at approx. 12 µs). In other words, the phase of the imaginary part Im of the second partial sequence ZCS* is inverted compared to the real part Re, different from the first partial sequence ZCS and different from the simple Z-C-sequence shown in FIG. 1. As is well-known, a complex value such as for example a value of a Z-C-sequence differs from its complex conjugate form only by the sign of the imaginary part (in Cartesian coordinates) or by the sign of the exponent (in polar coordinates). Thus, the real parts of both partial sequences are equal, but their imaginary parts are inverted to each other.

Figure 3:
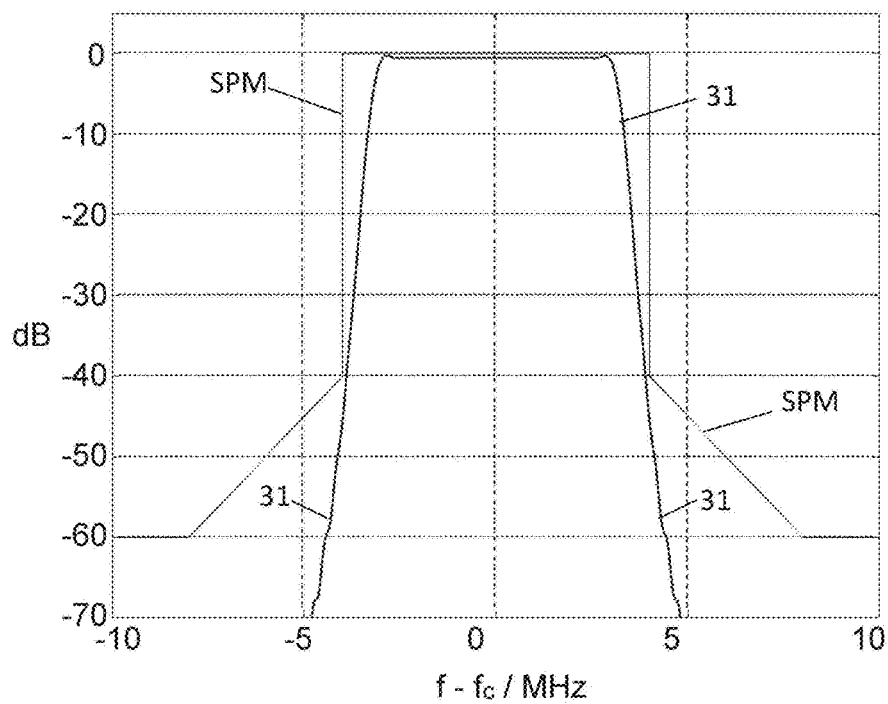
FIG. 3 shows a representation of the simple Zadoff-Chu-sequence in the frequency domain.

The radio spectrum of the synchronization sequence must meet certain prescribed requirements. In particular, only frequencies close to the carrier frequency may be used, while other frequencies must be attenuated. Thus, the spectrum must remain within a mask. FIG. 3 shows a spectral mask SPM where a maximum permissible deviation from the carrier frequency fc is e.g. +4 MHZ. Frequencies with greater deviation must be attenuated with at least −40 dB, and from approx. ±8 MHZ (in this example) with at least-60 dB. The above-mentioned fading-in and fading-out of the border areas of the sequence, and thus of the highest frequencies, results in the spectrum 31 of the simple Z-C-sequence being completely within (i.e., below) the spectral mask SPM, as shown in FIG. 1, since frequencies deviating ±4 MHz or more from the carrier frequency are correspondingly attenuated. When using other sequences, for example Z-C-sequences with M>1, the highest frequencies may occur within the inner part of the sequence and may be attenuated by filtering, if applicable.

Figure 4:
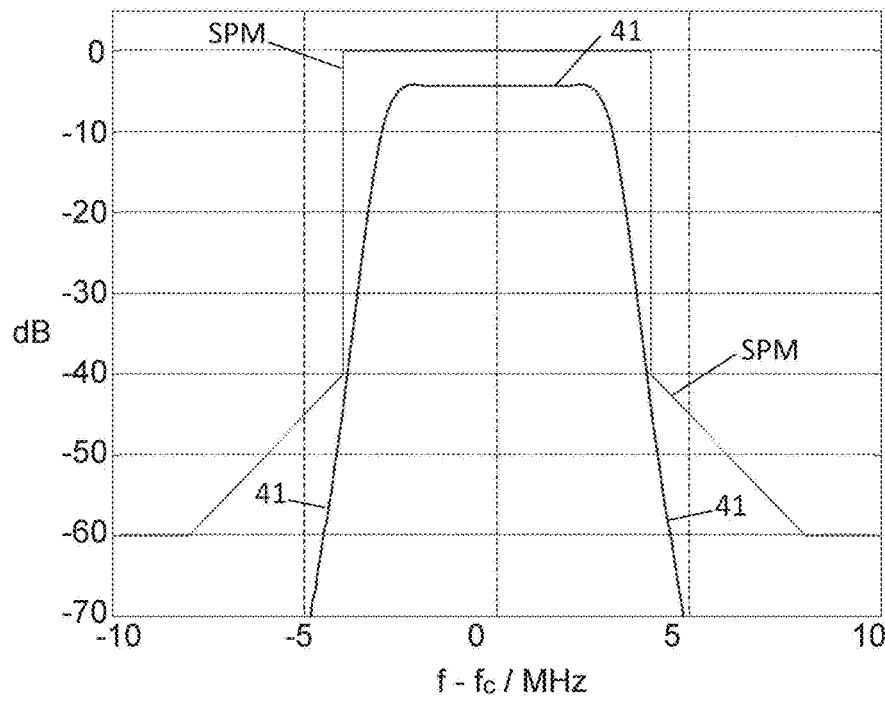
FIG. 4 shows a representation of the modified Zadoff-Chu-sequence in the frequency domain.

FIG. 4 shows the radio spectrum 41 of the modified Z-C-sequence of FIG. 2, which is also below the same mask SPM and therefore fulfils the regulatorily prescribed requirements for the spectrum. In other variants, also lesser or greater frequency deviations in the spectrum of the (Z-C-) sequences may be permissible, because different corresponding masks may be prescribed, e.g. with ±3 MHz or ±5 MHz.

FIG. 5 shows a time diagram of the correlation results of the modified Zadoff-Chu sequence according to FIG. 2 as occurring at the receiver. A cross-correlation of the received signal with the known Z-C-sequence and then with the complex conjugate Z-C-sequence, which is also known, is carried out in the receiver.

For example, a first correlation maximum indicating detection of the original Z-C-sequence being the first partial sequence is found in the received signal at a first point in time $t'_{11}$, as shown in FIG. 5 a). At a second point in time $t'_{21}$, a second correlation maximum is found, indicating detection of the complex conjugate Z-C-sequence being the second partial sequence in the received signal. The time span $\Delta t_1$ in between is measured at the receiver. Since the time difference or time span between the two partial sequences at the transmitter is known and constant, namely $\Delta t_0$, and since the deviations are symmetrical and therefore must relate equally to the first and the second partial sequence, the time offset can be calculated to be $$\Delta t_{CFO} = (\Delta t_1 - \Delta t_0)/2. \quad (2a)$$

Thus, the ideal (i.e. corrected) times $t_1$, $t_2$ of the correlation maxima can be determined to be $$t_2 = t'_{21} - \Delta t_{CFO} \quad (3a)$$

and $$t_1 = t'_{11} - \Delta t_{CFO}. \quad (4a)$$

Without the influence of the carrier frequency offset, the correlation maxima would be at these ideal or corrected points in time. Depicted in FIG. 5 b) is a different example, in which the time deviations or time offsets $\Delta t_{CFO}$ of the correlation maxima of the partial sequences each have a different sign. However, the same relationships between the values apply, so that the ideal or corrected points in time $t_1$, $t_2$ of the correlation maxima may be calculated in the same manner as above:

$$\Delta t_{CFO} = (\Delta t_2 - \Delta t_0)/2 \qquad (2b)$$

$$t_2 = t'_{21} - \Delta t_{CFO} \qquad (3b)$$

$$t_1 = t'_{12} - \Delta t_{CFO} \qquad (4b)$$

In both cases, the carrier frequency offset can be estimated or calculated respectively from the difference $\Delta t_{CFO}$ between the ideal and the actual correlation times, according to (for M=1)

$$\Delta t_{CFO} = N * f_{CFO}/f_s^2 \qquad (5)$$

wherein N is the length of the Z-C-sequence and $f_S$ is the known sampling frequency used for generating the Z-C-sequence.

In the first example shown in FIG. 5a, the carrier frequency offset is higher than in the second example shown in FIG. 5b, since the absolute value of the deviation $\Delta t_{CFO}$ is higher. Moreover, the carrier frequency offset in the first example has a different sign than in the second example since the time span between the correlation maxima is too short instead of too long. Therefore, also the signs of the time deviation $\Delta t_{CFO}$ are different in the two cases. Thus, if the carrier frequency is too high in the first example, it is too low in the second example, and vice versa. With the method described herein, however, the carrier frequency offset (including its sign) can be reliably determined in both cases.

Determining mathematically the actual carrier frequency offset is not computationally complex and may be performed e.g. by a processor. According to Eq. (5), it follows that $$f_{CFO} = \Delta t_{CFO} * f_s^2/N \qquad (6)$$

It is therefore possible, with known system parameters (parameters of the Z-C-sequence, time difference $\Delta t_0$ between the two partial sequences before transmission etc.), to determine in advance the time deviation $\Delta t_{CFO}$ (including its sign) resulting from a particular carrier frequency offset, e.g. by measurement. The relation between carrier frequency offset and time deviation can then be stored, e.g. as a fixed value or as a table for each used combination of N, M and $f_S$. The values are symmetric with respect to positive and negative time deviations, so that it is sufficient to store e.g. only the positive values. The sign then results from the sign of the time deviation. By multiplying a measured value of the time deviation $\Delta t_{CFO}$ with the respectively valid fixed value, the carrier frequency offset (or its absolute value) can then easily be determined.

FIG. 6 shows, in an embodiment, a block diagram of a synchronization device 600. The received signal Sin is provided to a correlator Corr that performs a cross-correlation against the known Z-C-sequence ZCS. If an amplitude maximum is detected at the correlation output, the time and phase of the maximum is output as the result C, and the correlator is switched to the complex conjugate Z-C-sequence ZCS*. The time and phase of the following maximum are output as the result C*. A time control unit TCU measures the time span between the maxima or the correlation results C,C* respectively, compares it to the known time span $\Delta t_0$ that is between the two partial sequences at the transmitter, and determines the time deviation as described above (Eq.2-4). This time deviation may optionally be output directly in order to synchronize a timer or clock, e.g. for controlling the TDMA. The time control unit TCU, or the synchronization device 600 respectively, may also comprise such timer, which then outputs a synchronization pulse SP e.g. for controlling a TDMA unit. Based on the synchronization pulse SP, the TDMA unit may e.g. transmit data in certain time slots of a time frame and receive data in other time slots of the time frame.

Moreover, the time control unit TCU also provides a signal towards a frequency offset determining unit FCU that determines a frequency offset from the time deviation. For this, a memory or optionally a table LUT may be used to determine from the measured time deviation or time offset the corresponding frequency offset. In an embodiment, the table LUT does not have a separate entry for each possible time offset, but the frequency offset determining unit FCU may interpolate between memory entries or table entries. In another embodiment, the frequency offset determining unit FCU comprises one or more programmed parameters that allow the conversion of the time offset into a frequency offset.

The correlation result C, C* comprises both time and phase information. From the phases of the correlation results of the partial sequences, the accuracy of the time and/or frequency offset and thus of the synchronization can be further improved.

The carrier frequency offset usually does not change over time, or it changes only very slowly. It is therefore usually not necessary, after having determined the carrier frequency offset and taken it into account for the reception, e.g. for demodulation, to determine the value again. In some cases it may be advantageous, however, to repeat the measurement and the carrier frequency offset determination process in regular intervals. But generally, the time synchronization must be repeated more often than the determination of the carrier frequency offset. This may be done based on the modified Z-C-sequence shown in FIG. 2 or as well based on the simple Z-C-sequence shown in FIG. 1. For example, the following temporal sequence may result:

$$(S2 - S2*) - D - S1 - D - S1 - \ldots - S1 - D - (S2 - S2*) -$$
$$D - S1 - D - S1 - \ldots - S1 - D - (S2 - S2*) - D - S1 -$$

wherein S1 is a first sequence, e.g. according to FIG. 1, S2 is a second sequence and S2* the complex conjugate of the second sequence, e.g. according to FIG. 2, and D is the data transmitted by the radio system (i.e., D usually represents a plurality of time slots). In a TDMA radio system, e.g. the first sequence S1 and the combination of the second sequence S2 and the complex conjugate second sequence S2* may occupy a time slot each, while the data D occupy the remaining time slots.

In one embodiment, the invention relates to a method for synchronizing a receiver based on a received signal that comprises at least one synchronization sequence consisting of at least two complex-valued partial sequences. A flow-chart is shown in FIG. 7. The automatically executed method 700 comprises the following steps. First, a cross-correlation of the received signal against a first reference sequence ZCS is performed 710, which corresponds to the first partial sequence. Herein, a correlation maximum, or amplitude maximum respectively, is detected at a first point in time $t'_{11}$, $t'_{12}$. This indicates that at this point in time the received signal contains the first partial sequence. Further, a cross-correlation of the received signal against a second reference sequence ZCS* is performed 720, the second reference sequence ZCS* corresponding to the second partial sequence and being a complex conjugate version of the first reference sequence ZCS. Herein, a correlation maximum, or amplitude maximum respectively, is detected at a second point in time $t'_{21}$, $t'_{22}$. Since the cross-correlation is very computationally expensive, it may be advantageous to perform the cross-correlation against the second reference sequence ZCS* only after the cross-correlation against the first reference sequence ZCS has already resulted in a correlation maximum. In that case, it is also possible to have both cross-correlations performed sequentially by the same correlator, if it is a configurable correlator.

A time span $\Delta t_1$, $\Delta t_2$ between the first and the second point in time is measured 730, and a time offset $\Delta t_{CFO}$ is determined 740 as explained above (Eq. 2-4) from the measured time span $\Delta t_1$, $\Delta t_2$ and the known time span $\Delta t_0$. The known time span $\Delta t_0$ is the one that is at the transmitting side between transmitting the first and the second partial sequence. Finally, the receiver is time synchronized 750 by correcting the receive time of the received synchronization sequence by the determined time offset $\Delta t_{CFO}$, wherein a corrected reference time is obtained. Alternatively, it is also possible to determine another point in time, e.g. in the middle between both maxima according to $t_{Ref}=(t'_{21}-t'_{11})/2=t'_{11}+\Delta t_1/2$ or $t_{Ref}=t'_{21}-\Delta t_1/2$ respectively, and select it as a reference time that is independent from the carrier frequency offset and therefore a corrected reference time. The corrected reference time can be used to synchronize a clock in the receiver. Moreover, a carrier frequency offset $\Delta f_{CFO}$ can be determined from the time offset $\Delta t_{CFO}$ and the carrier frequency can be corrected by the determined carrier frequency offset $\Delta f_{CFO}$ in further steps. With the corrected carrier frequency, it is possible to demodulate an OFDM signal, e.g. in a wireless receiver. Generally, complex-valued sequences with an auto-correlation of zero, and in particular Z-C-sequences, are suitable as partial sequences.

In one embodiment, an individual identifier may be inserted into the synchronization signal or into the transmitted signal respectively, in addition to the two partial sequences, in order to enable different, simultaneously operating neighboring radio systems to distinguish their synchronization signals. This allows such systems to be synchronized independently from each other. Further, also the sequence used in each case may vary, wherein the second partial sequence is always the complex conjugate of the first partial sequence.

A wireless receiver may comprise e.g. at least one synchronization device 600 and a frequency correction unit or frequency offset determination unit FCU adapted for generating a carrier frequency for demodulating a radio signal. The frequency correction unit obtains from the synchronization device 600 the determined carrier frequency offset $\Delta f_{CFO}$ and uses it to correct a setpoint carrier frequency by the determined carrier frequency offset. In a simple case, the frequency correction unit may comprise a multiplier, or a correspondingly configured processor respectively.

In one embodiment, the invention relates to a method for generating a synchronization signal for a radio signal. The method comprises generating a first complex-valued partial sequence ZCS and generating a second complex-valued partial sequence ZCS*, which is a complex conjugate version of the first partial sequence. The first partial sequence ZCS is transmitted at a first point in time and the second partial sequence ZCS* is transmitted at a second point in time via the radio signal, wherein a predefined time span $\Delta t_0$ is between the first and second point in time. The synchronization signal is formed by the total synchronization sequence, comprising the first partial sequence ZCS and the second partial sequence ZCS* within the predefined time span. The first or the second partial sequence may be a conventional Z-C-sequence. In one embodiment, each partial sequence has a spectrum of different frequencies, wherein the highest frequencies occur at the beginning and at the end of the partial sequence. The amplitudes of the synchronization signal may be reduced or attenuated at the beginning and at the end of each partial sequence (e.g. for 2-3 µs each, depending on the desired edge in the spectrum), compared to the center. This has the effect that the radio spectrum of the synchronization signal remains within the prescribed frequency mask, as described above.

In one embodiment, the invention relates to a device 800 having a processing unit PU configured for generating a synchronization signal for a radio signal. FIG. 8 shows a block diagram. The processing unit may be a correspondingly configured processor, for example. It comprises a first sequence generating unit Seq1 configured to generate a first complex-valued partial sequence and a second sequence generating unit Seq2 configured to generate a second complex-valued partial sequence, wherein the second partial sequence is a complex conjugate version of the first partial sequence. The first and the second sequence generating units Seq1, Seq2 may be identical, i.e. one and the same physical unit that is configured to operate in two different modes for the two partial sequences. The processing unit PU further comprises a control unit Ctr that is configured to combine the first and the second partial sequence into a synchronization signal, wherein a predefined time span $\Delta t_0$ is maintained between the beginning of the first partial sequence and the beginning of the second partial sequence. In one embodiment, the control unit Ctr may control e.g. at which point in time the respective partial sequence ZCS, ZCS* is generated. Since the partial sequences are predetermined, unchangeable and of the same length, also the time span between the end of the first partial sequence and the beginning of the second partial sequence is fixed. Likewise, also the time span between the end of the first partial sequence and the end of the second partial sequence is fixed. In one embodiment, the device 800 may, in addition to the two partial sequences, also insert an individual identifier into the transmission signal, so that different, simultaneously working neighboring radio systems can distinguish their respective synchronization signals and can thus be synchronized independent from each other. In an embodiment, the identifier may be inserted between or directly after the two partial sequences.

The invention may be used for synchronization in general, particularly for time synchronization and carrier frequency offset determination of radio signals, but also of other signals such as ultrasound signals. Small modifications to the invention as described above may be made without departing from the scope of the invention. For example, the sequential order of the original sequence and the complex conjugate sequence may be switched (whereby the sequential order may also be used to encode an information), frequencies and sequence lengths may be adapted to various different requirements, the initial phase of the sequence, or partial sequence respectively, may be modified (wherein the partial sequences remain complex conjugates of each other), the above-mentioned sequences S1, S2 may be identical or differ from each other, the determined carrier frequency offset may be reported back to the transmitter, etc.

Various embodiments of the invention may be implemented using a configurable computer or processor, which may be configured by a computer-readable storage medium having stored thereon instructions that when executed by the computer or processor cause the computer or processor to perform the steps of one of the methods described above.

The invention claimed is:

1. A method for synchronizing a receiver by using a received signal, the received signal comprising a synchronization sequence that comprises at least two complex-valued partial sequences, the method comprising:
   performing a cross-correlation of the received signal against a first reference sequence that corresponds to a first partial sequence of the at least two complex-valued partial sequences, wherein a first correlation maximum is detected at a first point in time;
   performing a cross-correlation of the received signal against a second reference sequence that corresponds to a second partial sequence of the at least two complex-valued partial sequences and that is a complex conjugate version of the first reference sequence, wherein a second correlation maximum is detected at a second point in time;
   measuring a time span between the first point in time and the second point in time;
   determining a time offset from the difference between the measured time span and a known time span; and
   time synchronizing the receiver, wherein at least one of the first and the second point in time is corrected by the determined time offset.

2. The method according to claim 1, wherein the received signal is a wirelessly received OFDM signal, and wherein each of the two partial sequences has a cyclic auto-correlation of zero.

3. The method according to claim 1, wherein the first or the second partial sequence is a Zadoff-Chu sequence.

4. The method according to claim 1, further comprising:
   determining a carrier frequency offset from the time offset; and
   correcting a carrier frequency by the determined carrier frequency offset.

5. The method according to claim 1, wherein the first correlation maximum and the second correlation maximum are indicated by respective first and second complex-valued correlation results, further comprising:
   determining for at least one of the correlation results a phase; and
   correcting the determined time offset, and/or a frequency offset determined from the time offset, based on the determined phase.

6. A non-transitory computer-readable storage medium having stored thereon instructions that when executed on a computer or processor, respectively cause the computer or processor to perform the method according to claim 1.

7. A method for generating a synchronization signal for a radio signal, comprising:
   generating a first complex-valued partial sequence;
   generating a second complex-valued partial sequence, which is a complex conjugate version of the first complex-valued partial sequence; and
   transmitting the first partial sequence at a first time and transmitting the second partial sequence at a second time via the radio signal, wherein a predefined time span is maintained between the first time and the second time, and wherein the first partial sequence, the second partial sequence and the predefined time span form the synchronization signal.

8. The method according to claim 7, wherein at least one of the first partial sequence and the second partial sequence is a Zadoff-Chu sequence.

9. The method according to claim 7, wherein different frequencies occur in each of the partial sequences, and wherein the highest frequencies occur at the beginning and at the end of each partial sequence.

10. The method according to claim 9, wherein amplitudes of the synchronization signal are attenuated at the beginning and at the end of each partial sequence, compared to the middle of each partial sequence, and wherein a radio spectrum of the synchronization signal remains within a prescribed frequency mask.

11. A device for synchronizing a receiver by using a received signal, the received signal comprising a synchronization sequence that comprises at least two complex-valued partial sequences, the device comprising:
   a correlator configured for performing a cross-correlation of the received signal against a first reference sequence corresponding to a first partial sequence of the at least two complex-valued partial sequences, wherein a first correlation result is output upon a first correlation maximum being detected at a first point in time, and further configured for performing a cross-correlation of the received signal against a second reference sequence corresponding to a second partial sequence of the at least two complex-valued partial sequences, the second reference sequence being a complex conjugate version of the first reference sequence, wherein a second correlation result is output upon a second correlation maximum being detected at a second point in time; and
   a time control unit configured for receiving the first and second correlation results and further configured for measuring a time span between the first and the second point in time, and further configured for determining a time offset from a difference between the measured time span and a known time span;
   wherein the receiver is time synchronized by setting a clock according to at least one of the first and the second point in time, corrected by the determined time offset.

12. The device according to claim 11, wherein the received signal is a wirelessly received OFDM signal, and wherein each of the two partial sequences has a cyclic auto-correlation of zero.

13. The device according to claim 11, wherein at least one of the first and the second partial sequences is a Zadoff-Chu sequence.

14. The device according to claim 11, further comprising:
   a frequency offset determining unit adapted for determining a carrier frequency offset based on a signal received from the time control unit.

15. The device according to claim 14, further comprising a memory for storing at least one value, wherein the carrier frequency offset is determined from the determined time offset by means of the at least one value stored in the memory.

16. A wireless receiver comprising:
at least one device for synchronizing according to claim 11; and
a frequency correction unit adapted for generating a carrier frequency for demodulating a radio signal, wherein the frequency correction unit receives a determined carrier frequency offset from the at least one device for synchronizing in order to correct a carrier frequency by the determined carrier frequency offset;
wherein the at least one device for synchronizing determines the determined carrier frequency offset from the determined time offset.

* * * * *